United States Patent
Saito et al.

(10) Patent No.: US 10,280,326 B2
(45) Date of Patent: May 7, 2019

(54) INK JET RECORDING METHOD AND INK JET RECORDING DEVICE

(71) Applicant: CANON KABUSHIKI KAISHA, Tokyo (JP)

(72) Inventors: Arihiro Saito, Saitama (JP); Kouhei Nakagawa, Tokyo (JP); Eiichi Nakata, Kawasaki (JP); Yoshihide Aikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/808,046

(22) Filed: Nov. 9, 2017

(65) Prior Publication Data
US 2018/0134907 A1 May 17, 2018

(30) Foreign Application Priority Data

Nov. 17, 2016 (JP) .................. 2016-224304
Oct. 20, 2017 (JP) .................. 2017-203705

(51) Int. Cl.
| | |
|---|---|
| *C09D 11/102* | (2014.01) |
| *C09D 11/326* | (2014.01) |
| *C08F 220/18* | (2006.01) |
| *C08F 212/08* | (2006.01) |
| *C09D 11/106* | (2014.01) |
| *C09D 11/107* | (2014.01) |
| *C09D 11/324* | (2014.01) |
| *C09D 11/38* | (2014.01) |
| *B41J 2/01* | (2006.01) |

(52) U.S. Cl.
CPC .......... *C09D 11/326* (2013.01); *C08F 212/08* (2013.01); *C08F 220/18* (2013.01); *C09D 11/102* (2013.01); *C09D 11/106* (2013.01); *C09D 11/107* (2013.01); *C09D 11/324* (2013.01); *C09D 11/38* (2013.01); *B41J 2/01* (2013.01)

(58) Field of Classification Search
CPC .... C08F 212/08; C08F 220/18; C09D 11/102; C09D 11/106; C09D 11/107; C09D 11/324; C09D 11/38; C09D 11/326
See application file for complete search history.

(56) References Cited

U.S. PATENT DOCUMENTS

| | | |
|---|---|---|
| 6,852,156 B2 | 2/2005 | Yeh et al. |
| 8,602,546 B2 | 12/2013 | Shimizu et al. |
| (Continued) | | |

FOREIGN PATENT DOCUMENTS

| | | |
|---|---|---|
| EP | 2 662 422 A1 | 11/2013 |
| EP | 2 662 423 A1 | 11/2013 |
| (Continued) | | |

OTHER PUBLICATIONS

Jan. 29, 2018 extended European Search Report in European Patent Appln. No. 17201793.1.

*Primary Examiner* — Lamson D Nguyen
(74) *Attorney, Agent, or Firm* — Venable LLP

(57) ABSTRACT

An ink jet recording method includes: performing application of aqueous ink onto a unit area by one relative scanning with a recording head and a recording medium to record an image, wherein the aqueous ink comprises a self-dispersion pigment, a urethane resin, and polyethylene glycol, a kind of the self-dispersion pigment is carbon black, number average molecular weight of the polyethylene glycol is 600 or more, and viscosity of the aqueous ink is 5 mPa·s or more.

17 Claims, 3 Drawing Sheets

(56) References Cited

U.S. PATENT DOCUMENTS

| | | |
|---|---|---|
| 8,602,547 B2 | 12/2013 | Nakata et al. |
| 8,991,993 B2 | 3/2015 | Nishino et al. |
| 9,388,322 B2 | 7/2016 | Kakikawa et al. |
| 9,505,941 B2 | 11/2016 | Hakamada et al. |
| 9,598,592 B2 | 3/2017 | Nakata et al. |
| 9,605,170 B2 | 3/2017 | Nakagawa et al. |
| 2015/0315393 A1 | 11/2015 | Xu et al. |
| 2016/0215153 A1 | 7/2016 | Okazaki et al. |

FOREIGN PATENT DOCUMENTS

| | | |
|---|---|---|
| EP | 2 862 906 A1 | 4/2015 |
| EP | 3 088 477 A1 | 11/2016 |
| JP | 2003-535949 A | 12/2003 |
| JP | 2013-253237 A | 12/2013 |
| JP | 2013-253238 A | 12/2013 |
| JP | 2015-117332 A | 6/2015 |
| WO | 01/94476 A2 | 12/2001 |
| WO | 2016/092309 A1 | 6/2016 |

INK JET RECORDING METHOD AND INK JET RECORDING DEVICE

BACKGROUND OF THE INVENTION

Field of the Invention

The present invention relates to an ink jet recording method and an ink jet recording device.

Description of the Related Art

Recently, there are more and more opportunities for using an ink jet recording device in the field of commercial printing or office printing. In the field of commercial printing or office printing, it is required to have a pigment ink for having excellent optical density of an image to be obtained. In general, the optical density of an image to be obtained can be enhanced by increasing the aggregation property of a pigment. In order to enhance the optical density of an image to be obtained, various kinds of ink have been investigated. A pigment ink containing self-dispersion pigment, urethane resin, and polyethylene glycol has been suggested (see, Japanese Patent Application Laid-Open Nos. 2013-253237 and 2013-253238). A pigment ink containing self-dispersion pigment, water soluble resin, surface active agent, and penetration solvent has been also suggested (see, Japanese Patent Application Laid-Open No. 2015-117332).

However, when the aggregation property of a pigment is enhanced, the pigment can easily aggregate also at ejection opening of a recording head, and thus it is difficult to obtain the sticking recovery property of ink. Since the optical density of an image and the sticking recovery property of ink are in trade-off relationship, it is difficult to have both the optical density of an image and the sticking recovery property of ink at high level.

To increase the recording speed, the inventors of the present invention applied the ink described in Japanese Patent Application Laid-Open Nos. 2013-253237, 2013-253238, and 2015-117332 to so-called one pass recording, and carried out the investigation. In the case of applying the one pass recording, an effort should be made for increasing the optical density of an image that is higher than before. However, it was found that, even when an image is recorded by using the ink described in Japanese Patent Application Laid-Open Nos. 2013-253237 and 2013-253238, which has been designed so as to have the optical density, the optical density is not obtained at the level that is required in recent days. Meanwhile, when an image is recorded by using the ink described in Japanese Patent Application Laid-Open No. 2015-117332, a certain amount of the optical density is obtained but it is still at an insufficient level, and thus it was found that there is still room for improvement. It was also found that, when the ink described in Japanese Patent Application Laid-Open No. 2015-117332 is left to stand for a long period of time while it is mounted in an ink jet recording device, the sticking recovery property of ink also becomes insufficient in conjunction with moisture evaporation of ink near ejection opening of a recording head.

SUMMARY OF THE INVENTION

Thus, an object of the present invention is to provide an ink jet recording method allowing excellent optical density of an image and excellent sticking recovery property of ink. Another object of the present invention is to provide an ink jet recording device using the ink jet recording method.

The present invention relates to an ink jet recording method including: performing application of aqueous ink onto a unit area by one relative scanning with a recording head and a recording medium to record an image, wherein the aqueous ink comprises a self-dispersion pigment, a urethane resin, and polyethylene glycol, a kind of the self-dispersion pigment is carbon black, number average molecular weight of the polyethylene glycol is 600 or more, and viscosity of the aqueous ink is 5 mPa·s or more.

The present invention also relates to an ink jet recording device including: a unit for performing application of aqueous ink onto a unit area by one relative scanning with a recording head and a recording medium, wherein the aqueous ink comprises a self-dispersion pigment, a urethane resin, and polyethylene glycol, a kind of the self-dispersion pigment is carbon black, number average molecular weight of the polyethylene glycol is 600 or more, and viscosity of the aqueous ink is 5 mPa·s or more.

According to the present invention, an ink jet recording method allowing excellent optical density of an image and excellent sticking recovery property of ink, and also an ink jet recording device can be provided.

Further features of the present invention will become apparent from the following description of exemplary embodiments with reference to the attached drawings.

DESCRIPTION OF THE EMBODIMENTS

Figure 1:
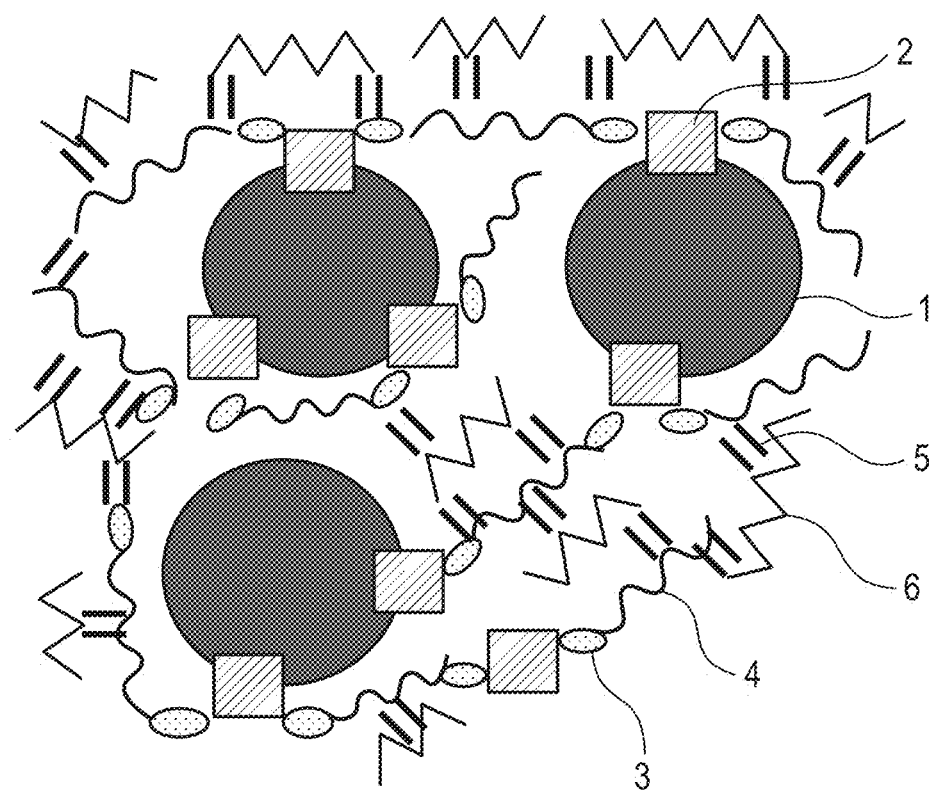
FIG. 1 is a diagrammatic view illustrating an association formed of a self-dispersion pigment, a urethane resin, and polyethylene glycol.

Preferred embodiments of the present invention will now be described in detail in accordance with the accompanying drawings.

Hereinbelow, the present invention is described in more detail in view of preferred embodiments. In the present invention, if the compound is a salt, the salt can be present as a dissociated ion in the ink. However, for the sake of convenience, it is described as "containing a salt". Furthermore, the aqueous ink may be simply described as "ink". The physical property values are the values at temperature of 25° C., unless specifically described otherwise.

The ink jet recording method of the present invention has a step of recording an image by performing application of an aqueous ink onto a unit area based on one relative scanning with a recording head and a recording medium (hereinbelow, it may be also described as "one pass recording"). When a recording head is a serial head, the unit area indicates one pixel corresponding to resolution, one band as an area of an image recorded by one scanning of the recording head, or the like. When a recording head is a line head, the unit area indicates an area of an image recorded by one relative scanning with the recording head and recording medium. The relative scanning indicates a movement in which, as a recording head moves, scanning of a recording head is made relative to a recording medium, or a movement in which, as a recording medium is conveyed, scanning of a recording medium is made relative to a recording head.

Compared to multi pass recording by which application of an aqueous ink onto a unit area of a recording medium is carried out by repeating several time the scanning of a recording head, the one pass recording can have higher recording speed as the application of an aqueous ink onto a unit area is carried out by one relative scanning with a recording head and a recording medium. However, when the recording speed is increased with one pass recording, a contact between recording media may be easily yielded when the recording media are overlaid after recording. As such, it is necessary that ink is quickly fixed on a recording medium so that ink contamination caused by contact between recording media can be suppressed. Due to such reasons, the one pass recording has less application amount of ink compared to multi pass recording.

As described in the above, even when the ink of Japanese Patent Application Laid-Open Nos. 2013-253237, 2013-253238, and 2015-117332 is applied for one pass recording which has a little application amount of ink, an image with optical density at the recently required level is not obtained. In this regard, inventors of the present invention investigated regarding the causes of failure of obtaining the optical density of an image. As a result of observing an image which has been recorded on a recording medium by using the ink of Japanese Patent Application Laid-Open Nos. 2013-253237, 2013-253238, and 2015-117332, it was found that the ink dots do not sufficiently spread. In addition, as a result of observing the cross section of a recording medium recorded with an image, it was found that part of the pigment precipitates inside the recording medium. From those aspects, it is believed that the failure of obtaining excellent optical density even by application of the ink of Japanese Patent Application Laid-Open Nos. 2013-253237 and 2013-253238 to one pass recording is due to the absence of ink design, which considers a case of having little application amount of ink. Furthermore, although the ink of Japanese Patent Application Laid-Open No. 2015-117332 has a design in which a case of having little application amount of ink is also considered so as to allow an application to one pass recording, it is believed that the optical density of an image is still at the insufficient level as it is difficult for the ink to remain on a recording medium due to low viscosity of the ink. As such, to have the optical density of an image which has been recorded by one pass, it is necessary to suppress the precipitation of a pigment inside a recording medium and, at the same time, to have easy spread of ink dots.

Accordingly, to achieve both the suppression of the precipitation of a pigment and easy spread of ink dots at the same time, the inventors of the present invention conducted studies on ink which contains a self-dispersion pigment, a urethane resin, and polyethylene glycol.

In a broad sense, the urethane resin indicates a resin which is synthesized by using (poly)isocyanate. The urethane resin generally used for aqueous ink for ink jet is synthesized by using polyisocyanate and a component which can react with it (e.g., polyol and polyamine), and if necessary, a cross-linking agent or a chain extender may be used therefor.

Once an ink is added onto a recording medium, it becomes easier for the self-dispersion pigment, urethane resin, and polyethylene glycol to get close to one another, and thus forming of an association of those three components is promoted. FIG. 1 is a diagrammatic view illustrating an association formed of a self-dispersion pigment 1, a urethane resin, and a polyethylene glycol 6. As there is a hydrophobic interaction between a surface of a particle of the self-dispersion pigment 1 and a hydrophobic part 2 present in the urethane resin, the urethane resin is present near the pigment. Furthermore, each of the oxygen atom which is present in urethane bond 3 (—NH—CO—O—) in the urethane resin or polyol 4 and the oxygen atom which is present in the polyethylene glycol 6 forms a hydrogen bond with a hydrogen atom of water molecule. Due to those reasons, the urethane resin and the polyethylene glycol 6 can have an interaction as mediated by water 5. Due to the forming of an association between the urethane resin and the polyethylene glycol 6, in which a great amount of the water 5 can be embraced, it becomes difficult for the water 5 in the ink to infiltrate into the recording medium. As it becomes difficult for the water 5 in the ink to infiltrate into a recording medium, precipitation of the self-dispersion pigment 1 in recording medium together with the water 5 in the ink can be suppressed. Furthermore, as a great amount of the water 5 is embraced by the association, it become difficult for the self-dispersion pigment 1 to aggregate, and thus easy spread of ink dots can be achieved. As such, according to forming of an association which can embrace a great amount of the water 5 after the ink is adhered onto a recording medium, both the suppression of the precipitation of a pigment and easy spread of ink dots can be achieved at the same time. As the ink dots spread sufficiently, the capillary force of the recording medium becomes higher than the force of embracing the water 5 by the association, and thus the water 5 embraced by the association can infiltrate into the recording medium. As a result, the self-dispersion pigment 1 remains on a surface or near the recording medium, and thus optical density of an image is enhanced.

Furthermore, in addition to the constitution described above, it is also necessary that the viscosity of ink is 5 mPa·s or more. Once evaporation of the water 5 occurs after adhesion on a recording medium, concentration of an association formed of the self-dispersion pigment 1, a urethane resin, and the polyethylene glycol 6 starts to increase so that viscosity of ink becomes rapidly higher. Due to those reasons, the ink can easily remain on the recording medium, thus yielding easier forming of an association in the ink. Due to the forming of an association, precipitation of a pigment is suppressed and easy spread of ink dots is obtained at the same time. By setting the viscosity of ink at 5 mPa·s or more, the optical density of an image can be enhanced.

Furthermore, when an ink containing the self-dispersion pigment 1, a urethane resin, and the polyethylene glycol 6 is used, the sticking recovery property of ink is also enhanced. When the ink described in Japanese Patent Application Laid-Open No. 2015-117332 is left to stand for a long period of time while it is mounted in an ink jet recording device, aggregation of pigment is caused accompanying the evaporation of moisture of an ink adhered near the ejection opening of a recording head. Due to those reasons, even after performing a recovery movement, the sticking recovery property of ink was not obtained as an aggregate of pigment sticks near the ejection opening.

On the other hand, an association of the self-dispersion pigment 1, a urethane resin, and the polyethylene glycol 6 can embrace a great amount of water so that the evaporation of moisture of an ink which is adhered near the ejection opening of a recording head can be suppressed. Furthermore, even if the evaporation of moisture of an ink occurs, the pigment is unlikely to have an aggregation as water can be replenished to an association from the ink present near the ejection opening. Accordingly, it becomes difficult for the aggregate of pigment, which is adhered near the ejection opening of a recording head, to stick, and thus the aggregate can be easily removed by a recovery movement. Thus, an improved sticking recovery property of ink is obtained.

Furthermore, if the viscosity of ink is less than 5 mPa·s, it is difficult per se for the ink to get adhered near the ejection opening of a recording head, and thus the sticking recovery property of ink is not impaired.

If a resin-dispersed pigment is used instead of the self-dispersion pigment 1, the resin adsorbed on the pigment becomes a steric hindrance so that it becomes difficult to have a hydrophobic interaction between a surface of a particle of the pigment and the hydrophobic part 2 present in the urethane resin. Accordingly, it becomes difficult to form an association, and thus the optical density of an image and sticking recovery property of ink are not obtained.

It is required that the number average molecular weight of the polyethylene glycol 6 is 600 or more. If one molecule of the polyethylene glycol 6 is long, when the polyethylene glycol 6 interacts with a urethane resin as mediated by one water molecule, it becomes easier for the polyethylene glycol 6 to interact with the urethane resin as mediated by plural water molecules. As a result, a great amount of water can be embraced between the urethane resin and the polyethylene glycol 6. Accordingly, easy spread of ink dots is obtained so that the optical density of an image is enhanced. Furthermore, as it becomes difficult for the pigment in ink, which is adhered near the ejection opening of a recording head, to aggregate so that the sticking recovery property of ink is improved. On the other hand, if the number average molecular weight is less than 600, there are only few oxygen atoms present in the polyethylene glycol 6 so that it becomes difficult to embrace a large amount of the water 5 between the urethane resin and the polyethylene glycol 6. Due to such reasons, the water 5 in the ink can easily infiltrate into the recording medium so that the self-dispersion pigment 1 precipitates with the water 5 in the ink. Furthermore, since ink dots cannot spread easily, the optical density of an image is not obtained. Furthermore, as it becomes difficult for the association to embrace the water 5 so that the pigment in the ink which has been adhered near the ejection opening of a recording head easily aggregates. Accordingly, the sticking recovery property of ink is not obtained.

<Ink Jet Recording Device>

The ink jet recording device of the present invention is provided with a unit by which application of an aqueous ink onto a unit area is carried out based on one relative scanning with a recording head and a recording medium. When a recording head is a serial head, the unit indicates a unit for applying an ink based on scanning of a recording head relative to a recording medium in accordance with movement of a recording head, or a unit for applying an ink based on scanning of a recording medium relative to a recording head in accordance with conveying of a recording medium. In a case in which the recording head is a line head, the line head does not move, and thus the unit indicates a unit for applying an ink based on scanning of a recording medium relative to a recording head, in accordance with conveying of a recording medium. The relative scanning is preferably scanning of a recording medium relative to a recording head in accordance with conveying of a recording medium. Examples of a recording head allowing one pass recording include a serial head and a line head. In particular, the recording head is preferably a line head which allows image recording at higher speed. Examples of an ink jet recording device allowing one pass recording include a serial type ink jet recording device and a line type ink jet recording device. It is not necessary that the ink jet recording device of the present invention is provided with a unit for irradiation of energy ray.

Figure 2:
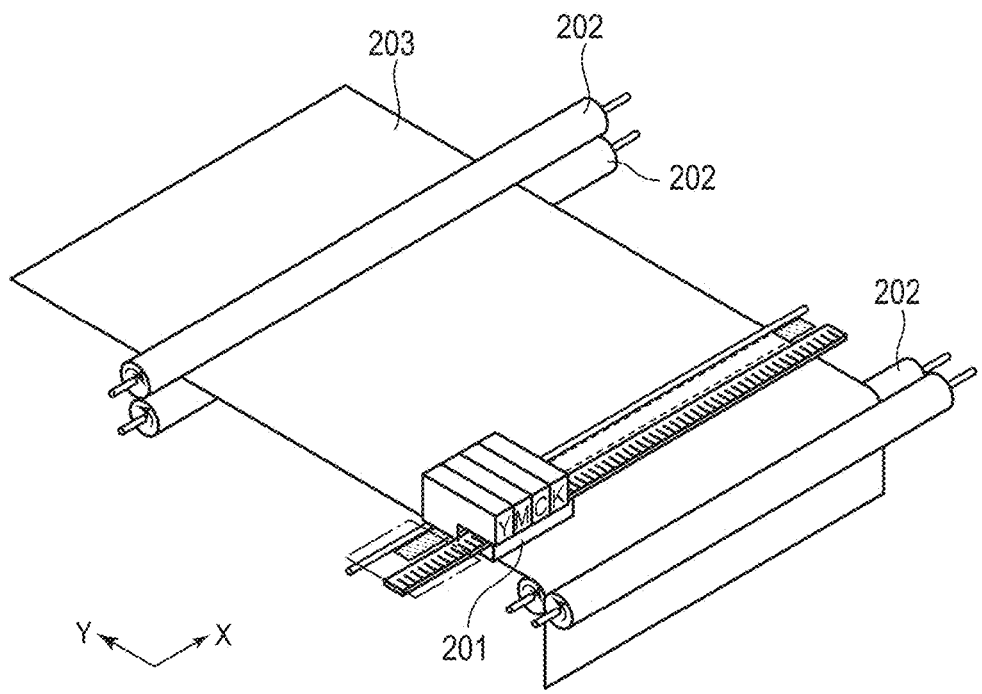
FIG. 2 is a perspective view illustrating the main part of a serial type ink jet recording device.

First, descriptions are given for a serial type ink jet recording device. FIG. 2 is a perspective view illustrating the main part of a serial type ink jet recording device. At the same time of mounting an ink cartridge, ink is ejected from a recording head to have recording on a recording medium 203 while scanning of a carriage 201 provided with a recording head (not illustrated) is carried out in direction X (i.e., major scanning direction) illustrated in the drawing. By a roller 202, the recording medium 203 is sent in direction Y (i.e., minor scanning direction) illustrated in the drawing. The carriage 201 forms an image while it moves along the major direction. However, when the carriage 201 arrives at the end of a recording medium, only the width portion of the recorded image is sent in the minor scanning direction to the recording medium 203. After that, the carriage 201 moves again along the major scanning direction to record an image. As a result of repeating them, one pass recording is carried out.

Figure 3:
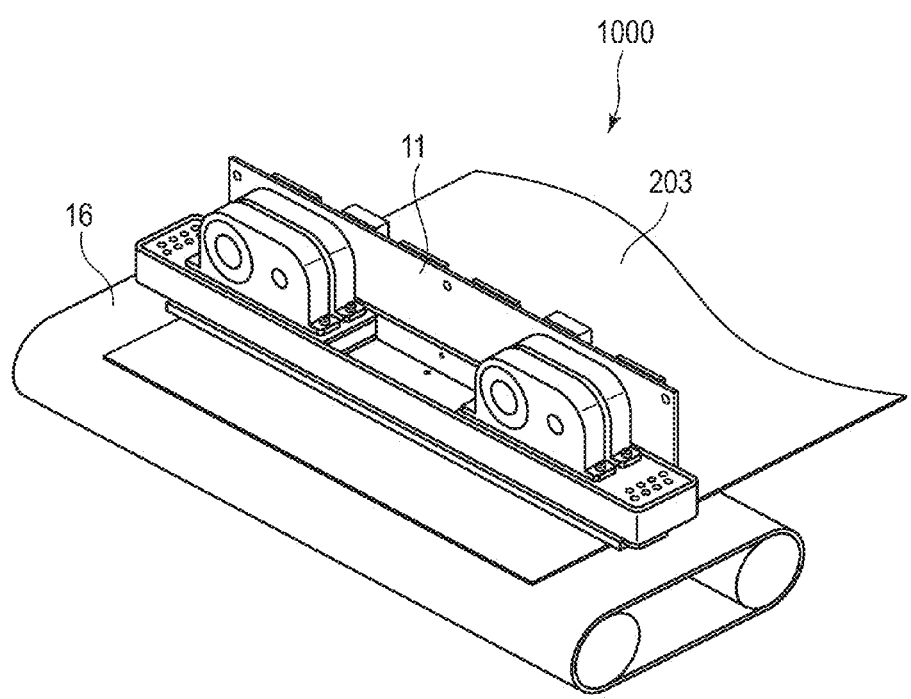
FIG. 3 is a perspective view illustrating the main part of a line type ink jet recording device.
Figure 3:
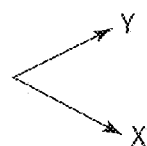

Next, descriptions are given for a line type ink jet recording device. FIG. 3 is a perspective view illustrating the main part of a line type ink jet recording device. An ink jet recording device 1000 is provided with a conveying part 16 for conveying the recording medium 203 and a recording head 11 which is arranged perpendicular to the direction of conveying the recording medium 203. There is no scanning of a recording head. However, as the recording medium 203 is conveyed in direction Y illustrated in the drawing, an image is recorded. According to the recording head 11, an ejection opening for ejecting an ink is disposed over the entire width region of a recording medium and the recording is made in accordance with conveying of the recording medium 203, and thus one pass recording is achieved.

In a case in which an ink with each color of cyan, magenta, yellow, and black is separately mounted in the recording head 11 and an image is recorded by using four of the recording head 11 corresponding to those four colors, one pass recording can be achieved if an ink with the same color for each unit area is ejected from one ejection opening by the recording head 11. Furthermore, if an ink is ejected from the recording head 11 which has a column of four ejection openings, which correspond to four colors of cyan, magenta, yellow, and black, one pass recording can be achieved. Furthermore, even when the ejection openings are arranged in zigzag shape, they are taken as one column of ejection openings. It is not necessary to contain in an ink a compound which is polymerized by irradiation of energy ray.

<Ink>

The ink jet recording method of the present invention uses an aqueous ink containing a self-dispersion pigment, a urethane resin, and polyethylene glycol. Hereinbelow, descriptions of "(meth)acrylic acid" and "(meth)acrylate are understood to represent "acrylic acid, methacrylic acid" and "acrylate, methacrylate", respectively. In the present invention, the "unit" regarding a resin indicates a repeating unit derived from one monomer.

(Self-dispersion Pigment)

A kind of the self-dispersion pigment is carbon black. As for the self-dispersion pigment, those obtained by binding an anionic group to a surface of a pigment particle, either directly or as mediated by other atomic group, are preferably used.

Examples of the anionic group include —COOM, —SO$_3$M, and —PO$_3$M$_2$. Examples of M include, each independently, a hydrogen atom; an alkali metal; ammonium (NH$_4$); and organic ammonium. Examples of other atomic group include an alkylene group; an arylene group; an amide group; a sulfonyl group; and imino group; a carbonyl group; an ester group; an ether group; and a group in which they are combined. Content (% by mass) of the self-dispersion pigment in the ink is, on the basis of the total mass of the ink, preferably 1.00% by mass or more to 10.00% by mass or less, and more preferably 4.00% by mass or more to 8.00% by mass or less.

Surface charge amount (mmol/g) can be used as an indicator of the amount of an anionic group contained in the self-dispersion pigment, and it can be measured by colloid titration. The surface charge amount (mmol/g) of the self-dispersion pigment is preferably 0.25 mmol/g or more to 0.70 mmol/g or less, and more preferably 0.30 mmol/g or more to 0.50 mmol/g or less.

When the surface charge amount is less than 0.25 mmol/g, there are only few anionic groups contained in the pigment so that the surface of particle of a pigment is exposed more. As the hydrophobic part of the urethane resin can more easily have a hydrophobic interaction with the surface of a particle of a pigment, it becomes easier for the urethane resin to present near the pigment. As such, it becomes difficult for the oxygen atom of a urethane bond in the urethane resin or the oxygen atom of polyol to have a hydrogen bond with hydrogen atom of a water molecule. As it becomes difficult to embrace water between the urethane resin and polyethylene glycol, water in the ink can easily infiltrate into a recording medium so that the pigment precipitates with water in the ink. Furthermore, since ink dots cannot spread easily, there may be a case in which sufficient optical density of an image is not obtained. Furthermore, as it becomes difficult for an association of the self-dispersion pigment, urethane resin, and polyethylene glycol to embrace water, the pigment in the ink which has been adhered near the ejection opening of a recording head easily aggregates. Accordingly, there may be a case in which a sufficient sticking recovery property of ink is not obtained.

When the surface charge amount is more than 0.70 mmol/g, there are many anionic groups contained in the pigment so that the surface of particle of a pigment is exposed less. As it becomes difficult for the hydrophobic part of the urethane resin to have a hydrophobic interaction with the surface of a particle of a pigment, it becomes difficult to form an association of the self-dispersion pigment, urethane resin, and polyethylene glycol. Accordingly, there may be a case in which a sufficient optical density of an image and a sufficient sticking recovery property of ink are not obtained.

The self-dispersion pigment in which an anionic group is directly bound to a surface of a pigment is produced by various methods. From the viewpoint of the productivity or cost, a self-dispersion pigment produced by a method for oxidation treatment of a pigment with an oxidizing agent like hydrogen peroxide or hypochlorite salt, or by a method for oxidation treatment of a pigment with ozone gas, or the like is used frequently. However, when the surface of a pigment particle is subjected to an oxidation treatment, a non-ionic group like hydroxyl group is easily introduced to the surface of a pigment particle. Since the non-ionic group easily forms a hydrogen bond with cellulose as a main component of paper, the exposed area on a surface of a pigment particle is reduced. Accordingly, the hydrophobic part of the urethane resin is less likely to have a hydrophobic interaction with the exposed area on a surface of a pigment particle, and thus it is difficult to form an association in which a self-dispersion pigment, a urethane resin, and polyethylene glycol are included. Accordingly, there may be a case in which a sufficient optical density of an image and a sufficient sticking recovery property of ink are not obtained.

(Urethane Resin)

The urethane resin generally used for an aqueous ink is synthesized by using at least polyisocyanate and a component which can react with the polyisocyanate (i.e., polyol and polyamine), and if necessary, a crosslinking agent or a chain extender is also used. Hereinbelow, descriptions are given for each monomer which becomes a constitutional unit of a urethane resin.

Furthermore, in order to exhibit the effect of the urethane resin with good efficiency, having a urethane resin like a resin including an acrylic resin chain (i.e., so-called urethane-acryl complex resin) is not much preferable. Furthermore, having a urethane resin of active energy ray curing type, i.e., urethane resin with polymerizable group, is not much preferable, either. The acid number (mgKOH/g) of the urethane resin is preferably 50 mgKOH/g or more to 150 mgKOH/g or less. The acid number is obtained by colloid titration using potential difference. The weight average molecular weight of the urethane resin is preferably 20,000 or more to 40,000 or less. The weight average molecular weight indicates polystyrene converted weight average molecular weight that is obtained by gel permeation chromatography (GPC).

Content (% by mass) of the urethane resin in the ink is, on the basis of the total mass of the ink, preferably 0.10% by mass or more to 10.00% by mass or less, and more preferably 0.30% by mass or more to 5.00% by mass or less. Furthermore, content (% by mass) of the urethane resin in the ink is, in terms of the mass ratio relative to the content (% by mass) of the self-dispersion pigment, preferably 0.05 times or more to 1.00 times or less. When the mass ratio is less than 0.05 times, the urethane resin is deficient compared to the pigment, and also water to be embraced between the urethane resin and polyethylene glycol is reduced. Due to those reasons, the water in the ink can easily infiltrate into a recording medium so that the pigment precipitates with water in the ink. Furthermore, since ink dots cannot spread easily, there may be a case in which sufficient optical density of an image is not obtained. Furthermore, as it becomes difficult for the association to embrace water, the pigment in the ink which has been adhered near the ejection opening of a recording head easily aggregates. Accordingly, there may be a case in which a sufficient sticking recovery property of ink is not obtained. On the other hand, when the mass ratio is more than 1.00 times, the urethane resin is present in a large amount relative to the pigment, and also there is more water to be embraced between the urethane resin and polyethylene glycol. Accordingly, it becomes difficult to have separation of water from the association so that the pigment is not likely to aggregate. Accordingly, there may be a case in which a sufficient optical density of image is not obtained.

[Polyisocyanate]

The "polyisocyanate" constituting the urethane resin in the aqueous ink of the present invention indicates a compound having two or more isocyanate groups in the molecule to have a reaction with polyol or polyamine, or the like. Ratio (% by mass) of the unit derived from the polyisocyanate which is present in the resin is preferably 10.0% by mass or more to 90.0% by mass or less. Examples of the polyisocyanate include an aliphatic or aromatic polyisocyanate.

Examples of the aliphatic polyisocyanate include polyisocyanate having a chain structure like tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methyl-1,5- pentane diisocyanate; and polyisocyanate having a cyclic structure like isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanatemethyl)cyclohexane; or the like.

Examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate, and α,α,α',α'-tetramethylxylylene diisocyanate.

Among them, the polyisocyanate is preferably aliphatic polyisocyanate, and it is more preferably at least one selected from a group consisting of isophorone diisocyanate and hexamethylene diisocyanate.

[Polyol]

As for the component to be a unit for constituting the urethane resin according to a reaction with the above polyisocyanate, it is possible to use polyol. In the present invention, the term "polyol" indicates a compound which has two or more hydroxyl groups in the molecule, and examples thereof include polyol having no acidic group like polyether polyol, polyester polyol, and polycarbonate polyol; polyol having acidic group; or the like. Only one kind of polyol can be used or two or more kinds of poly can be used, if necessary. Ratio (% by mass) of the unit derived from polyol in the resin is preferably 10.0% by mass or more to 90.0% by mass or less.

[Polyol Having No Acidic Group]

Examples of the polyether polyol include an addition polymerization product of alkylene oxide and polyols; glycols like (poly)alkylene glycol; or the like. Examples of the alkylene oxide include ethylene oxide, propylene oxide, butylene oxide, and α-olefin oxide. Furthermore, examples of the polyols for addition polymerization with alkylene oxide include diols such as 1,3-propane diol, 1,3-butane diol, 1,4-butane diol, 1,5-pentane diol, 1,6-hexane diol, 3-methyl-1,5-pentane diol, 2-butyl-2-ethyl-1,3-propane diol, 1,4-cyclohexane diol, 1,4-cyclohexane dimethanol, 4,4-dihydroxyphenylpropane, 4,4-dihydroxyphenylmethane, hydrogenated bisphenol A, or dimethylol urea and a derivative thereof; triols such as glycerin, trimethylol propane, 1,2,5-hexane triol, 1,2,6-hexane triol, pentaerythritol, trimethylolmelamine, and a derivative thereof, or polyoxypropylene triol; or the like. Examples of the glycols include (poly)alkylene glycol such as tetramethylene glycol, hexamethylene glycol, ethylene glycol, diethylene glycol, triethylene glycol, tetraethylene glycol, polyethylene glycol, propylene glycol, dipropylene glycol, tripropylene glycol, polypropylene glycol, (poly)tetramethylene glycol, or neopentyl glycol; a copolymer of ethylene glycol-propylene glycol; or the like.

Examples of the polyester polyol include acid ester. Examples of the acid component for constituting the acid ester include aromatic dicarbonic acid such as phthalic acid, naphthalene dicarbonic acid, biphenyl dicarbonic acid, or tetrahydrophthalic acid; aliphatic dicarbonic acid such as hydrogenated product of those aromatic dicarbonic acids; aliphatic dicarbonic acid such as malonic acid, succinic acid, tartaric acid, oxalic acid, glutaric acid, adipic acid, pimellic acid, suberic acid, azelaic acid, sebacic acid, alkylsuccinic acid, linolenic acid, maleic acid, fumaric acid, mesaconic acid, citraconic acid, or itaconic acid; or the like. Furthermore, an anhydride, a salt, a derivative (alkyl ester, acid halide, or the like) thereof can be also used as an acid component. Furthermore, examples of the component for forming an ester with an acid component include polyols such as diol or triol; glycols such as (poly)alkylene glycol; or the like. Examples of the polyols and glycols include those exemplified above as a component for constituting the polyether polyol.

As for the polycarbonate polyol, polycarbonate polyol that is produced by a known method can be used. Specific examples thereof include alkane diol-based polycarbonate diol like polyhexamethylene carbonate diol. Further examples thereof include polycarbonate diol which is obtained by reacting an aliphatic diol component with a carbonate component like alkylene carbonate, diaryl carbonate, and dialkyl carbonate or phosgene.

Among them, the polyol having no acidic group preferably contains polyether polyol, and it more preferably contains polyethylene glycol or polypropylene glycol which has only few carbons but has high hydrophilicity. By using polyethylene glycol or polypropylene glycol, water can be more easily embraced together with the urethane resin, and thus it is difficult for the water in the ink to infiltrate into a recording medium. Accordingly, it is unlikely to have precipitation of a pigment together with the water in the ink. Furthermore, as ink dots can spread easily, the optical density of an image is enhanced. Furthermore, as it becomes easier for the association to embrace water, the pigment in the ink which has been adhered near the ejection opening of a recording head is not likely to aggregate. Accordingly, the sticking recovery property of ink is enhanced.

Ratio (% by mol) of a unit derived from polyol having no acidic group in the urethane resin in the ink relative to the total amount of the unit derived from polyol is preferably 0.0% by mol or more to 30.0% by mol or less, and more preferably 0.0% by mol or more to 10.0% by mol or less.

[Polyol Having Acidic Group]

Examples of the polyol having an acidic group include polyols having an acidic group such as carbonic acid group, sulfonic acid group, and phosphoric acid group. The acidic group is preferably a carbonic acid group. Examples of the polyol group having a carbonic acid group include dimethylol acetic acid, dimethylol propionic acid, dimethylol butanoic acid, and dimethylol butyric acid. Among them, dimethylol propionic acid is preferable. The acidic group of the polyol having an acidic group can be in the salt form, and examples of a cation for forming the salt include an ion of alkali metal like lithium, sodium, and potassium, an ammonium ion, and a cation of organic amine like dimethylamine. Furthermore, since the number average molecular weight of a polyol having an acidic group for universal use is 400 or so, the unit derived from polyol having an acidic group basically becomes a hard segment of the urethane resin.

Ratio (% by mol) of a unit derived from polyol having an acidic group in the urethane resin in the ink relative to the total amount of the unit derived from polyol is preferably 70.0% by mol or more to 100.0% by mol or less, and more preferably 90.0% by mol or more to 100.0% by mol or less.

[Chain Extender, Crosslinking Agent]

For synthesis of the urethane resin, a crosslinking agent or a chain extender may be used. In general, the crosslinking agent is used for synthesizing a prepolymer and a chain extender is used for carrying out a chain extending reaction for a prepolymer which has been synthesized in advance. Basically, depending on the purpose like crosslinking and chain extension, the crosslinking agent or chain extender can be suitably selected from water, polyamine or the like other than polyisocyanate and polyol that are described above.

Examples of the polyamine include ethylenediamine, propylenediamine, hexylenediamine, diethylenetriamine, triethylenetetramine, tetraethylenepentamine, isophoronediamine, xylylenediamine, diphenylmethanediamine, hydrogenated diphenylmethanediamine, hydrazine, polyamide polyamine, and polyethylene polyimine. Further, similar to the polyol having an acidic group for universal use, the molecular weight of a polyamine for universal use is also 400 or so, and thus the unit derived from polyamine basically becomes a hard segment of the urethane resin. As a chain extender, those capable of crosslinking the urethane resin can be also used.

[Method for Synthesis]

As for the method for synthesizing the urethane resin, any method generally used as a method for synthesizing a urethane resin in a related art can be used, and examples thereof include the following method. By using polyisocyanate and a compound which can react with polyisocyanate (e.g., polyol or polyamine), a prepolymer is synthesized. At that time, an organic solvent with boiling point of 100° C. or lower can be used, and if necessary, the acidic group of a prepolymer is neutralized by using a neutralizing agent. After that, by adding the prepolymer to a liquid containing chain extender or crosslinking agent, a chain extending reaction or a crosslinking reaction is carried out. Subsequently, by removing the organic solvent for a case in which it is used, the urethane resin is obtained.

Examples of the neutralizing agent include an organic base such as N,N-dimethylethanol amine, N,N-diethylethanol amine, diethanol amine, triethanol amine, trimethylamine, or triethylamine; an inorganic base such as sodium hydroxide, potassium hydroxide, and ammonia; or the like. The neutralizing agent is used preferably at 0.5 to 1.0 mol, and more preferably at 0.8 to 1.0 mol relative to 1.0 mol of the acidic group present in prepolymer. If it is outside this range, there may be a case in which instability or viscosity increase of a liquid containing the urethane resin is caused so that the workability for producing ink is slightly impaired.

Number of the reacting group (e.g., isocyanate group, hydroxyl group, amino group, and imino group) per molecule of a compound used for synthesis of the urethane resin (polyisocyanate, polyol, polyamine, or the like) is determined according to the desired properties of the urethane resin. For example, a compound having one reacting group per molecule becomes a unit which is present at the end of the urethane resin. Furthermore, a compound having two or more reacting groups per molecule becomes a unit which is present at a position inserted to other unit for constituting the urethane resin. In particular, a compound having three or more reacting groups per molecule becomes a unit for crosslinking the urethane resin. In a case in which it is desired to have crosslinking of the urethane resin, it is favorable to use, as a constitutional unit, a unit derived from a compound which has three or more reacting groups per molecule, depending on desired crosslinking level. In contrast, in a case in which no crosslinking is desired for the urethane resin, it is favorable to use, as a constitutional unit, only a unit derived from a compound which has two reacting groups per molecule.

[Method for Analysis]

Composition of the urethane resin can be analyzed according to the method described below. First, descriptions are given for a method for extracting a urethane resin from the ink containing urethane resin. Specifically, by adding an excessive amount of an acid (e.g., hydrochloric acid) to a supernatant which has been fractionated by centrifuge of the ink at 80,000 rpm, a precipitated urethane resin can be extracted. It is also possible that the urethane resin is fractionated according to drying of the supernatant to solid. It is also possible that, by using an organic solvent which dissolves the urethane resin but not a pigment (e.g., hexane), the urethane resin can be extracted from ink. Furthermore, although the analysis can be carried with ink, by using the urethane resin (solid) extracted by the aforementioned method, the analysis can be carried out with higher precision.

After drying the urethane resin which has been fractionated as described above, it is dissolved in deuterated dimethyl sulfoxide to prepare a sample as a measurement subject. Then, according to the position of peaks that are obtained by carrying out an analysis of the sample based on proton nuclear magnetic resonance ($^1$H-NMR), types of polyisocyanate, polyol, polyamine, or the like can be determined. Furthermore, it is also possible to calculate the compositional ratio from the integrated values of the chemical shift peak of each component. It is also possible to determine the types of polyisocyanate, polyol, polyamine, or the like according to analysis of the urethane resin based on thermal degradation gas chromatography. It is also possible to calculate the number average molecular weight by performing an analysis based on carbon nuclear magnetic resonance spectroscopy ($^{13}$C-NMR) and obtaining the repeat number of fragment unit of polyol having no acidic group.

It is also possible that the dried urethane resin is dissolved in tetrahydrofuran, and according to potentiometric titration which uses ethanol titration solution of potassium hydroxide, ratio of the polyol having an acidic group in the polyol is measured.

(Polyethylene Glycol)

Number average molecular weight of the polyethylene glycol is preferably 600 or more to 4,000 or less. If the number average molecular weight is more than 4,000, the association can easily embrace a great amount of water so that it becomes difficult for water to be separated from the association. Accordingly, as it is not likely to have an aggregation of the pigment, there may be a case in which the optical density of an image is not obtained at sufficient level. Content (% by mass) of the polyethylene glycol in the ink is preferably 0.10% by mass or more to 30.00% by mass or less, and more preferably 6.00% by mass or more to 20.00% by mass or less on the basis of the total mass of the ink. Content (% by mass) of the polyethylene glycol in the ink is, in terms of the mass ratio relative to the content (% by mass) of self-dispersion pigment, preferably 0.10 times or more to 5.00 times or less, and more preferably 1.10 times or more to 3.30 times or less. If this mass ratio is less than 1.10 times, the polyethylene glycol is present in a smaller amount compared to the pigment so that the amount of water which can be embraced between the urethane resin and polyethylene glycol is small. Due to such reasons, water in the ink can easily penetrate a recording medium, yielding precipitation of the pigment together with the water in the ink. Furthermore, as ink dots cannot spread easily, there may be a case in which the optical density of an image is not obtained at sufficient level. Furthermore, as it becomes difficult for the association to embrace water, the pigment in the ink which has been adhered near the ejection opening of a recording head is likely to aggregate. Accordingly, there may be a case in which the sticking recovery property of ink is not obtained at sufficient level. On the other hand, if the mass ratio is more than 3.30 times, the polyethylene glycol is present in a larger amount compared to the pigment so that the amount of water which can be embraced between the urethane resin and polyethylene glycol is also large. Due to such reasons, water is not likely to get separated from the association, and thus it becomes difficult for the pigment to aggregate. Accordingly, there may be a case in which the optical density of an image is not obtained at sufficient level.

The number average molecular weight of polyethylene glycol described in the present invention includes a value within a range of plus/minus 30. For example, in the case of polyethylene glycol having number average molecular weight of 600, those having molecular weight of from 570 to 630 or so are described to have number average molecular weight of 600. More specifically, those having number average molecular weight of form 570 to 630 or so as determined by the measurement method described below is referred to as polyethylene glycol with number average molecular weight of 600.

[Method for Calculating Number Average Molecular Weight]

The number average molecular weight of polyethylene glycol in the present invention indicates a value which is measured as described below. 1 g (weighed to digit number of 0.1 mg) of a polyethylene glycol sample as a measurement subject is added to 25 mL solution of anhydrous phthalic pyridine which has been precisely weighed with a flask having stopper. After closing the stopper, it is heated for 2 hours in boiling water bath, and then allowed to stand till to the room temperature. After that, 50 mL (precisely weighed) of 0.5 mol/L aqueous solution of sodium hydroxide and 10 drops of phenolphthalein solution for titration are added to the flask. The liquid inside the flask is titrated by using 0.5 mol/L aqueous solution of sodium hydroxide and the point at which the liquid maintains red color for 15 minutes is taken as the end point. From the titration amount M (mL) of this test which is obtained as described above, and the titration amount R (mL) which is obtained from a blank test in which the test is carried out in the same manner as above except the polyethylene glycol sample is not used, calculation is made as follows: Number average molecular weight={(Collection amount (g) of polyethylene glycol sample))×4000}/{(M−R)×0.5 (mol/L)}.

(Acrylic Resin)

It is preferable that the ink additionally contains an acrylic resin. There may be a case in which part of the surface of a particle of the pigment remains exposed without having any hydrophobic interaction with the urethane resin. When the ink contains no acrylic resin, if the ink is left to stand for a long period of time while it is mounted in an ink jet recording device, the exposed part of the pigment which is present in the ink adhered near the ejection opening of a recording head can easily experience a hydrophobic interaction. As the pigment aggregates accordingly, the association can easily stick near the ejection opening. Accordingly, there may be a case in which the sticking recovery property of ink is not obtained at sufficient level. As the ink further contains an acrylic resin, the hydrophobic part of the acrylic resin has a hydrophobic interaction with the exposed part on a surface of a particle of the pigment, and thus the pigment is not likely to aggregate. Accordingly, it is difficult for the association to stick, and thus the sticking recovery property of the ink is further improved. Furthermore, the hydrophobic interaction between the acrylic resin and pigment is weak when compared to the hydrophobic interaction between the urethane resin and pigment. As such, forming of the association of a self-dispersion pigment, a urethane resin, and polyethylene glycol is not much suppressed by the acrylic resin.

Content (% by mass) of the acrylic resin in the ink is preferably 0.20% by mass or more to 4.00% by mass or less, and more preferably 0.50% by mass or more to 2.00% by mass or less on the basis of the total mass of the ink. Content (% by mass) of the acrylic resin in the ink is, in terms of the mass ratio relative to the content (% by mass) of the urethane resin, preferably 0.20 times or more. If this mass ratio is less than 0.20 times, the acrylic resin is present in a smaller amount compared to the urethane resin so that there is no sufficient amount of the acrylic resin which can interact with the surface of a particle of the pigment having no interaction with the urethane resin. Due to such reasons, the exposed part of the pigment experiences a hydrophobic interaction, yielding easier aggregation of the pigment. Accordingly, there may be a case in which the sticking recovery property of ink is not obtained at sufficient level. The aforementioned mass ratio is preferably 3.85 times or less.

The acrylic resin is a resin having a unit which is derived from at least one kind selected from a group consisting of (meth)acrylic acid and alkyl (meth)acrylate. Examples of the alkyl (meth)acrylate include ethyl (meth)acrylate, methyl (meth)acrylate, (iso)propyl (meth)acrylate, (n-, iso-, tert-) butyl (meth)acrylate, and 2-ethylhexyl (meth)acrylate. In the present invention, it is preferably a resin which has a unit derived from (meth)acrylic acid or alkyl (meth)acrylate, and a unit derived from a monomer other than those. Also with regard to the acrylic resin, the "unit" indicates a repeating unit which is derived from one monomer. Examples of other monomer include a monomer having an aromatic group such as styrene, α-methylstyrene, or benzyl (meth)acrylate. In particular, the acrylic resin is preferably a resin having a unit derived from (meth)acrylic acid or styrene.

The acid number (mgKOH/g) of the acrylic resin is preferably 100 mgKOH/g or more to 200 mgKOH/g or less. The acid number of the acrylic resin can be measured according to the same method as the acid number of the urethane resin. The weight average molecular weight (Mw) using calibration of polystyrene as obtained by GPC of the acrylic resin is preferably 5,000 or more to 15,000 or less. The weight average molecular weight of the acrylic resin can be measured according to the same method as the weight average molecular weight of the urethane resin.

(Surface Active Agent)

It is preferable that the ink additionally contains a surface active agent. The surface active agent is preferably a nonionic surface active agent. That is because, if an anionic surface active agent is used, it can react with a cationic component of a recording medium (e.g., loading material, alumina, alumina hydrate, and cationic resin) so as to lose the function of a surface active agent, and thus the effect of being contained in the ink is easily impaired. Examples of the nonionic surface active agent include an adduct of perfluoroalkylethylene oxide, polyoxyethylene alkyl ether, ethylene oxide-propylene oxide adduct, an ethylene oxide adduct of acetylene glycol.

In particular, the nonionic surface active agent is preferably an ethylene oxide adduct of acetylene glycol which has HLB value of 12 or lower according to Griffin method. Being difficult to form a micelle, the ethylene oxide adduct of acetylene glycol easily enters a space between an association in the ink and a recording medium. Furthermore, as the HLB value of the ethylene oxide adduct of acetylene glycol is 12 or lower, the ethylene oxide adduct of acetylene glycol can have higher hydrophobicity, and thus it can be quickly aligned at an interface between the ink and a recording medium. Accordingly, ink dots can easily spread on a recording medium so that the optical density of an image is further enhanced. HLB value of the ethylene oxide adduct of acetylene glycol is more preferably 5 or more.

Herein, the HLB value according to Griffin method is calculated from the formula relating to the amount of a hydrophilic group in surface active agent and molecular weight of a surface active agent, i.e., HLB value=20× (Amount of ethylene oxide group in surface active agent)/ (Molecular weight of surface active agent). The HLB value indicates the degree of hydrophilicity or lipophilicity of a surface active agent (compound) within a range of from 0.0 to 20.0. A lower HLB value indicates higher lipophilicity (hydrophobicity) of a compound. On the other hand, a higher HLB value indicates higher hydrophilicity of a compound.

(Aqueous Medium)

The ink contains water or an aqueous medium as a mixture solvent of water and a water soluble organic solvent. As for the water, it is preferable to use deionized water (ion exchange water). As for the water soluble organic solvent, a water soluble organic solvent other than polyethylene glycol (i.e., other water soluble organic solvent) can be used in combination. Examples of other water soluble organic solvent which can be used include alcohols, glycols, glycol ethers, and nitrogen-containing compounds. Furthermore, one or more kinds of those water soluble organic solvents may be contained in the ink.

Content (% by mass) of water in the ink is, on the basis of the total mass of the ink, preferably 50.00% by mass or more to 95.00% by mass or less. Furthermore, content (% by mass) of the water soluble organic solvent in the ink is, on the basis of the total mass of the ink, preferably 3.00% by mass or more to 50.00% by mass or less. The content is a value including polyethylene glycol. When the content of the water soluble organic solvent is less than 3.00% by mass, there may be a case in which the reliability like ejection stability is not obtained at sufficient level if the ink is used for an ink jet recording device. Furthermore, when the content of a water soluble organic solvent is more than 50.00% by mass, the viscosity of ink increases and thus unfavorable supply of ink may occur.

(Other Components)

Other than the above-described components, the ink may contain a water soluble organic compound which is solid at temperature of 25° C. such as urea, a urea derivative, trimethylol ethane, trimethylol propane, or the like. Furthermore, the ink may contain various additives such as a pH adjuster, an antifoaming agent, an anticorrosive agent, an antiseptic agent, a fungicide, an antioxidant, a reduction preventive agent, a chelating agent, and the like according to demand.

(Physical Properties of Ink)

Viscosity of the ink is 5 mPa·s or more. The viscosity is preferably 11 mPa·s or less. Viscosity of the ink can be suitably adjusted by modifying the type or amount of a pigment, a surface active agent, or a water soluble organic solvent in the ink. Furthermore, surface tension of the ink is preferably 35 mN/m or less. When the surface tension is higher than 35 mN/m, it becomes difficult for ink dots to spread after the ink is adhered on a recording medium, and thus there may be a case in which the optical density of an image is not obtained at sufficient level. Surface tension of the ink can be suitably adjusted by modifying the type or amount of a surface active agent or a water soluble organic solvent in the ink. The surface tension is preferably 30 mN/m or higher. Furthermore, pH of the ink is preferably 7.0 or more to 9.0 or less.

EXAMPLES

The present invention is described in further detail below by giving examples and comparative examples, but the present invention is not limited to the examples described below unless being beyond the scope of the gist of the present invention. Furthermore, "parts" and "%" that are described with regard to the amount of components are based on mass, unless specifically described otherwise.

Abbreviations are as follows. IPDI: isophorone diisocyanate, HDI: hexamethylene diisocyanate, PPG: polypropylene glycol, PEG: polyethylene glycol, PTMG: polytetramethylene glycol, PC: polyhexamethylene carbonate diol, PES: polyester polyol, DMPA: dimethylol propionic acid, and EDA: ethylenediamine.

<Synthesis of Urethane Resin>

The polyol having no acidic group described in Table 1 was dissolved in methyl ethyl ketone and, after adding polyisocyanate and polyol having an acidic group described in Table 1, the reaction was allowed to occur for 1 hour at temperature of 75° C. to obtain a prepolymer solution. The obtained prepolymer solution was cooled to temperature of 60° C. and the acidic group was neutralized by adding an aqueous solution of potassium hydroxide. After that, the temperature was lowered to 40° C. and ion exchange water was added, and then emulsification was carried out by mixing at high speed using a homomixer. After the emulsification, a chain extender was added and the chain extending reaction was carried out for 12 hours at temperature of 30° C. When the presence of an isocyanate group is not shown according to Fourier transform infrared spectroscopy (FT-IR), the solution was heated under reduced pressure to distillate off the methyl ethyl ketone. As a result, a liquid containing the urethane resin in which content of the urethane resin is 20.00% was obtained. In Table 1, the acid number (mgKOH/g) and weight average molecular weight are described.

The method for measuring the acid number of the urethane resin is as described below. By using an automatic potentiometric titrator (AT-510, manufactured by Kyoto Electronic MFG Co., Ltd.) mounted with a stream potential titration unit (PCD-500) and carrying out colloid titration utilizing potential difference, the acid number was measured for the urethane resin which has been dissolved in tetrahydrofuran. At that time, an ethanol solution of potassium hydroxide was used as a titration reagent.

The weight average molecular weight of the urethane resin was measured by GPC as follows. Over 24 hours at temperature of 25° C., the resin was dissolved in tetrahydrofuran (THF). The obtained solution was filtered through a membrane filter to obtain a sample solution. An adjustment of the sample solution was made such that concentration of the components dissolved in THF is 0.3% approximately. By using this sample solution, the weight average molecular weight of the resin was measured at the following conditions.

Apparatus: Waters 2695 Separations Module, manufactured by Waters Company
RI Detector: 2414 detector, manufactured by Waters Company Columns: 4 series of KF-806M, manufactured by Showa Denko K. K.
Eluent: tetrahydrofuran (THF)
Flow rate: 1.0 mL/min
Oven temperature: temperature of 40° C.
Sample injection amount: 100 μL For calculation of the weight average molecular weight of the resin, a molecular weight calibration curve which has been established by using standard polystyrene resin (TSK standard polystyrene F-850, F-450, F-288, F-128, F-80, F-40, F-20, F-10, F-4, F-2, F-1, A-5000, A-2500, A-1000, A-500, manufactured by Tosoh Corporation) was used.

TABLE 1

Composition and characteristics of urethane resin

| No. of urethane resin | Polyol having no acidic group | | Polyisocyanate | | Polyol having acid group | | Chain extender | | Acid number (mgKOH/g) | Weight average molecular weight |
|---|---|---|---|---|---|---|---|---|---|---|
| | Type | Use amount | Type | Use amount | Type | Use amount | Type | Use amount | | |
| 1 | PPG2000 | 31.6 | IPDI | 46.9 | DMPA | 21.5 | EDA | 2.1 | 90 | 30000 |
| 2 | PEG2000 | 31.6 | IPDI | 46.9 | DMPA | 21.5 | EDA | 2.1 | 90 | 30000 |
| 3 | PTMG2000 | 31.6 | IPDI | 46.9 | DMPA | 21.5 | EDA | 2.1 | 90 | 30000 |
| 4 | PPG2000 | 31.6 | HDI | 35.5 | DMPA | 21.5 | EDA | 2.1 | 101 | 30000 |
| 5 | PC2000 | 31.6 | IPDI | 46.9 | DMPA | 21.5 | EDA | 2.1 | 90 | 30000 |
| 6 | PES2000 | 31.6 | IPDI | 46.9 | DMPA | 21.5 | EDA | 2.1 | 90 | 30000 |

<Synthesis of Acrylic Resin>

By using the monomers (parts) described in Table 2 and following a common method, the acrylic resins 1 to 4 were synthesized. By using 10.0% aqueous solution of potassium hydroxide, the carboxy group was neutralized, and by further adding a suitable amount of ion exchange water, a liquid containing the acrylic resins 1 to 4, in which the content of the acrylic resin is 20.00%, was obtained. Furthermore, by using the monomers (parts) described in Table 2 and following a common method, the acrylic resin 5 was synthesized. By using 10.0% aqueous solution of potassium hydroxide, the carboxy group was neutralized, and by further adding a suitable amount of ion exchange water, a liquid containing the acrylic resin 5, in which the content of the acrylic resin is 15.00%, was obtained. At the bottom of Table 2, the acid number and weight average molecular weight of the acrylic resin are described. The method for measuring the acid number and weight average molecular weight of the acrylic resin is the same as the measurement method for the urethane resin.

TABLE 2

Composition of acrylic resin

| | No. of acrylic resin | | | | |
|---|---|---|---|---|---|
| | 1 | 2 | 3 | 4 | 5 |
| Styrene | 81.0 | 60.0 | | | 87.5 |
| Butyl acrylate | | 21.0 | 27.0 | 27.0 | |
| Benzyl methacrylate | | | 50.0 | 54.0 | |
| Acrylic acid | 19.0 | 19.0 | | 19.0 | 12.5 |
| Methacrylic acid | | | 23.0 | | |
| Acid number (mgKOH/g) | 148 | 148 | 150 | 148 | 97 |
| Weight average molecular weight | 10000 | 10000 | 10000 | 10000 | 8000 |

<Preparation of Pigment Dispersion>

(Surface charge amount of pigment) The method for measuring the surface charge amount of a pigment is as described below. By using an automatic potentiometric titrator (AT-510, manufactured by Kyoto Electronic MFG Co., Ltd.) mounted with a stream potential titration unit (PCD-500) and carrying out colloid titration utilizing potential difference, the surface charge amount was measured. At that time, 5 mmol/L methyl glycol chitosan was used as a titration reagent. As for the carbon black, carbon black having specific surface area of 220 m$^2$/g and DBP oil absorption amount of 105 mL/100 g was used.

(Pigment Dispersion 1)

To a solution in which 5.00 g of conc. hydrochloric acid is dissolved in 5.50 g of water, 1.60 g of 4-amino-1-benzene carbonic acid was added at the temperature of 5° C. Under stirring in an ice bath to maintain the temperature at 10° C. or lower, the solution obtained in the above was added with a solution in which 1.80 g of sodium nitrite is dissolved in 9.00 g of water. After stirring for 15 minutes, 6.00 g of carbon black was added and mixed therein. Furthermore, after stirring for 15 minutes, the obtained slurry was filtered through a filter paper (standard filter paper No. 2, manufactured by Advantec Co., Ltd.). The carbon black was sufficiently washed and dried in an oven at the temperature of 110° C. To the obtained carbon black, water was added, and also, by changing the counter ion to sodium ion based on ion exchange, a pigment dispersion 1 (content of a pigment is 15.00%) was obtained. In the pigment dispersion 1, self-dispersion carbon black having $-C_6H_3-(COONa)_2$ group bound to a surface of the particle is included. The surface charge amount of the self-dispersion carbon black was 0.40 mmol/g.

(Pigment Dispersion 2)

With regard to the preparation of the pigment dispersion 1, the amount of 4-amino-1-benzene carbonic acid was modified to 1.00 g. Other than that, a pigment dispersion 2 (content of a pigment is 15.00%) was obtained according to the same order as the preparation of the pigment dispersion 1. The surface charge amount of the self-dispersion carbon black was 0.25 mmol/g.

(Pigment Dispersion 3)

With regard to the preparation of the pigment dispersion 1, the amount of 4-amino-1-benzene carbonic acid was modified to 2.80 g. Other than that, a pigment dispersion 3 (content of a pigment is 15.00%) was obtained according to the same order as the preparation of the pigment dispersion 1. The surface charge amount of the self-dispersion carbon black was 0.70 mmol/g.

(Pigment Dispersion 4)

With regard to the preparation of the pigment dispersion 1, the amount of 4-amino-1-benzene carbonic acid was modified to 0.80 g. Other than that, a pigment dispersion 4

(content of a pigment is 15.00%) was obtained according to the same order as the preparation of the pigment dispersion 1. The surface charge amount of the self-dispersion carbon black was 0.20 mmol/g.

(Pigment Dispersion 5)

With regard to the preparation of the pigment dispersion 1, the amount of 4-amino-1-benzene carbonic acid was modified to 3.00 g. Other than that, a pigment dispersion 5 (content of a pigment is 15.00%) was obtained according to the same order as the preparation of the pigment dispersion 1. The surface charge amount of the self-dispersion carbon black was 0.75 mmol/g.

(Pigment Dispersion 6)

20.00 g of carbon black, 11.60 mmol of a treatment agent, 20.00 mmol of nitric acid, and 100.00 mL of water were admixed. As for the treatment agent, sodium salt of ((4-aminobenzoylamino)-methane-1,1-diyl)bisphosphonic acid was used. By using a Silverson mixer, mixing was carried out at conditions including temperature of 25° C. and 6,000 rpm for 30 minutes. To the obtained mixture, an aqueous solution containing 20.00 mmol of sodium nitrite dissolved in a small amount of water was slowly added. In accordance with addition of the aqueous solution, temperature of the mixture reached 60° C. At the temperature of 60° C., the mixture was reacted for 1 hour. After that, by using 1.0 mol/L aqueous solution of potassium hydroxide, pH of the mixture was adjusted to 10. After 30 minutes, the mixture was added with 20.00 mL of water, and by using a spectrum membrane, removal of materials with low molecular weight and desalting were carried out. Furthermore, by diluting the mixture with water, a pigment dispersion 6 (content of a pigment is 15.00%) in which self-dispersion carbon black is contained was obtained. In the pigment dispersion 6, self-dispersion carbon black having —$C_6H_4$—CONH—CH($PO_3K_2$)$_2$ group bound to a surface of the particle is included. The surface charge amount of the self-dispersion carbon black was 0.40 mmol/g.

(Pigment Dispersion 7)

With reference to the descriptions of Example 3 of Japanese Patent Application Laid-Open No. 2003-535949, carbon black was oxidized by using ozone gas. After preliminary dispersion of carbon black with ion exchange water, an ozone treatment was carried out for 8 hours. Next, while the mixture is adjusted to pH 7 by adding potassium hydroxide, the mixture was dispersed for 3 hours using a liquid-liquid collision type disperser followed by purification by ultrafiltration. After that, pH was adjusted to 10 by using an aqueous solution of potassium hydroxide. By adding a suitable amount of ion exchange water, a pigment dispersion 7 (content of a pigment is 15.00%) was obtained. The surface charge amount of the self-dispersion carbon black was 0.40 mmol/g.

(Pigment Dispersion 8)

15.00 parts of carbon black, 50.00 parts of a liquid containing resin, and 35.00 parts of ion exchange water were admixed. As for the resin, a styrene-acrylic acid copolymer which has acid number of 160 mgKOH/g and weight average molecular weight of 10,000 was used. As for the liquid containing resin, a liquid with resin content of 15.00%, which has been neutralized with 10.0% aqueous solution of sodium hydroxide in the same molar amount as the acid number of the copolymer, was used. The mixture was dispersed by using a batch type vertical sand mill (manufactured by IMEX Co., Ltd.) which has been charged with 85.0 parts of zirconia beads having a diameter of 0.3 mm to conduct a dispersing treatment for 3 hours while cooling with water. After that, the dispersion was centrifuged to remove coarse particles and subjected to filtration under pressure using a cellulose acetate filter with pore size of 3.0 µm (manufactured by Advantec Co., Ltd.). According to this method, a pigment dispersion 8 (content of a pigment is 15.00%, and resin content is 7.50%) having a pigment dispersed by the resin in water was obtained.

(Pigment Dispersion 9)

Self-dispersion pigment having benzene carbonic acid group bound to a surface of carbon black particles (Cab-O-Jet300, manufactured by Cabot Corporation) was diluted with water and sufficiently stirred to obtain a pigment dispersion 9 in which content of a pigment is 15.00%.

<Preparation of Ink>

By mixing each component described in Tables 4 to 6, ink was prepared. Viscosity of the ink was measured by using a rotary viscometer (RE80 type viscometer, manufactured by Toki Sangyo Co., Ltd.) at conditions including temperature of 25° C. Furthermore, the static surface tension of ink was measured by using a surface tensiometer (CBVP—Z type, manufactured by Kyowa Interface Science) at conditions including temperature of 25° C. Pigment content P, content of polyethylene glycol with number average molecular weight of 600 or more (in the Tables 4 to 6, it is described as content E of PEG (number average molecular weight of 600 or more)), urethane resin content U, and acrylic resin content A are described at the bottom of Tables 4 to 6. Furthermore, the mass ratio of polyethylene glycol relative to pigment (described as E/P in the Tables 4 to 6) and mass ratio of urethane resin relative to pigment (described as U/P in the Tables 4 to 6) are described at the bottom of Tables 4 to 6. Furthermore, the mass ratio of acrylic resin relative to urethane resin (described as A/U in the Tables 4 to 6), and values of the viscosity of ink and surface tension of ink are described at the bottom of Tables 4 to 6. The number attached to the polyethylene glycol indicates number average molecular weight. The type of a surface active agent and HLB values calculated according to Griffin method are described in Table 3.

TABLE 3

| Type of non-ionic surface active agent | | | |
| --- | --- | --- | --- |
| Product name | Compound name | Manufacturer | HLB value |
| Acetylenol E100 | Ethylene oxide adduct of acetylene glycol | Kawaken Fine Chemicals | 13 |
| Acetylenol E60 | | Kawaken Fine Chemicals | 11 |
| NIKKOL BL-9EX | Polyoxyethylene alkyl ether | Nikko Chemicals | 15 |
| Zonyl FS3100 | Perfluloroalkylethylene oxide adduct | Du Pont | 10 |
| Adeka Pluronic L31 | Ethylene oxide-propylene oxide adduct | Adeka | 2 |

TABLE 4

Composition and characteristics of ink

| | No. of ink | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Pigment dispersion 1 | 40.00 | | 40.00 | 40.00 | 40.00 | 40.00 | 40.00 | 40.00 | 40.00 | 40.00 | 40.00 | 40.00 | 40.00 |
| Pigment dispersion 2 | | | | | | | | | | | | | |
| Pigment dispersion 3 | | | | | | | | | | | | | |
| Pigment dispersion 4 | | | | | | | | | | | | | |
| Pigment dispersion 5 | | | | | | | | | | | | | |
| Pigment dispersion 6 | | 40.00 | | | | | | | | | | | |
| Pigment dispersion 7 | | | | | | | | | | | | | |
| Pigment dispersion 8 | | | | | | | | | | | | | |
| Pigment dispersion 9 | | | | | | | | | | | | | |
| Liquid containing the urethane resin 1 | 5.00 | 5.00 | 5.00 | 5.00 | 5.00 | 5.00 | 5.00 | 5.00 | 5.00 | 5.00 | 5.00 | 1.50 | 30.00 |
| Liquid containing the urethane resin 2 | | | | | | | | | | | | | |
| Liquid containing the urethane resin 3 | | | | | | | | | | | | | |
| Liquid containing the urethane resin 4 | | | | | | | | | | | | | |
| Liquid containing the urethane resin 5 | | | | | | | | | | | | | |
| Liquid containing the urethane resin 6 | | | | | | | | | | | | | |
| Liquid containing the acrylic resin 1 | 5.00 | 5.00 | 5.00 | 5.00 | 5.00 | 5.00 | 5.00 | 5.00 | | 1.00 | 0.90 | 5.00 | 5.00 |
| Liquid containing the acrylic resin 2 | | | | | | | | | | | | | |
| Liquid containing the acrylic resin 3 | | | | | | | | | | | | | |
| Liquid containing the acrylic resin 4 | | | | | | | | | | | | | |
| Liquid containing the acrylic resin 5 | | | | | | | | | | | | | |
| Glycerin | 9.00 | 9.00 | 9.00 | 9.00 | 9.00 | 9.00 | 9.00 | 9.00 | 9.00 | 9.00 | 9.00 | 9.00 | 9.00 |
| PEG200 | | | | | | | | | | | | | |
| PEG400 | | | | | | | | | | | | | |
| PEG600 | | | 10.00 | | | | | | | | | | |
| PEG1000 | 10.00 | 10.00 | | 7.00 | 6.60 | 19.80 | 6.20 | 20.20 | 10.00 | 10.00 | 10.00 | 10.00 | 10.00 |
| PEG4000 | | | | | | | | | | | | | |
| PEG6000 | | | | | | | | | | | | | |
| Diethylene glycol | | | | | | | | | | | | | |
| Triethylene glycol | 8.00 | 8.00 | 8.00 | 4.00 | 11.40 | | 11.80 | | 8.00 | 8.00 | 8.00 | 8.00 | 5.50 |
| 2-Pyrrolidone | | | | | | | | | | | | | |
| 1,2-Hexane diol | | | | | | | | | | | | | |
| Acetylenol E60 | 0.50 | 0.50 | 0.50 | 0.50 | 0.50 | 0.50 | 0.50 | 0.50 | 0.50 | 0.50 | 0.50 | 0.50 | 0.50 |
| Acetylenol E100 | | | | | | | | | | | | | |
| NIKKOL BL-9EX | | | | | | | | | | | | | |
| Zonyl FS3100 | | | | | | | | | | | | | |
| Adeka Pluronic L31 | | | | | | | | | | | | | |
| Ion exchange water | 22.50 | 22.50 | 22.50 | 29.50 | 22.50 | 20.70 | 22.50 | 20.30 | 27.50 | 26.50 | 26.60 | 26.00 | |
| Pigment content P (%) | 6.00 | 6.00 | 6.00 | 6.00 | 6.00 | 6.00 | 6.00 | 6.00 | 6.00 | 6.00 | 6.00 | 6.00 | 6.00 |
| Content E (%) of PEG (number average molecular weight of 600 or more) | 10.00 | 10.00 | 10.00 | 7.00 | 6.60 | 19.80 | 6.20 | 20.20 | 10.00 | 10.00 | 10.00 | 10.00 | 10.00 |
| Urethane resin content U (%) | 1.00 | 1.00 | 1.00 | 1.00 | 1.00 | 1.00 | 1.00 | 1.00 | 1.00 | 1.00 | 1.00 | 0.30 | 6.00 |
| Acrylic resin content A (%) | 1.00 | 1.00 | 1.00 | 1.00 | 1.00 | 1.00 | 1.00 | 1.00 | 0.00 | 0.20 | 0.18 | 1.00 | 1.00 |
| E/P (times) | 1.67 | 1.67 | 1.67 | 1.17 | 1.10 | 3.30 | 1.03 | 3.37 | 1.67 | 1.67 | 1.67 | 1.67 | 1.67 |
| U/P (times) | 0.17 | 0.17 | 0.17 | 0.17 | 0.17 | 0.17 | 0.17 | 0.17 | 0.17 | 0.17 | 0.17 | 0.05 | 1.00 |
| A/U (times) | 1.00 | 1.00 | 1.00 | 1.00 | 1.00 | 1.00 | 1.00 | 1.00 | 0.00 | 0.20 | 0.18 | 3.33 | 0.17 |
| Viscosity of ink (mPa · s) | 7 | 7 | 6 | 5 | 6 | 9 | 6 | 9 | 6 | 6 | 6 | 6 | 11 |
| Surface tension of ink (mN/m) | 32 | 32 | 32 | 32 | 32 | 32 | 32 | 32 | 32 | 32 | 32 | 32 | 32 |

TABLE 5

Composition and characteristics of ink

| | No. of ink | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| Pigment dispersion 1 | 40.00 | 40.00 | 40.00 | 40.00 | 40.00 | 40.00 | 40.00 | | | | | | 40.00 |
| Pigment dispersion 2 | | | | | | | | 40.00 | | | | | |
| Pigment dispersion 3 | | | | | | | | | 40.00 | | | | |
| Pigment dispersion 4 | | | | | | | | | | 40.00 | | | |
| Pigment dispersion 5 | | | | | | | | | | | 40.00 | | |
| Pigment dispersion 6 | | | | | | | | | | | | | |
| Pigment dispersion 7 | | | | | | | | | | | | 40.00 | |
| Pigment dispersion 8 | | | | | | | | | | | | | |
| Pigment dispersion 9 | | | | | | | | | | | | | |
| Liquid containing the urethane resin 1 | 1.30 | 30.30 | 5.00 | 5.00 | 5.00 | 5.00 | 5.00 | 5.00 | 5.00 | 5.00 | 5.00 | 5.00 | 5.00 |
| Liquid containing the urethane resin 2 | | | | | | | | | | | | | |
| Liquid containing the urethane resin 3 | | | | | | | | | | | | | |
| Liquid containing the urethane resin 4 | | | | | | | | | | | | | |
| Liquid containing the urethane resin 5 | | | | | | | | | | | | | |

TABLE 5-continued

Composition and characteristics of ink

| | No. of ink | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| Liquid containing the urethane resin 6 | | | | | | | | | | | | | |
| Liquid containing the acrylic resin 1 | 5.00 | 5.00 | 5.00 | 5.00 | 5.00 | 5.00 | 5.00 | 5.00 | 5.00 | 5.00 | 5.00 | 5.00 | 5.00 |
| Liquid containing the acrylic resin 2 | | | | | | | | | | | | | |
| Liquid containing the acrylic resin 3 | | | | | | | | | | | | | |
| Liquid containing the acrylic resin 4 | | | | | | | | | | | | | |
| Liquid containing the acrylic resin 5 | | | | | | | | | | | | | |
| Glycerin | 9.00 | 9.00 | 9.00 | 9.00 | 9.00 | 9.00 | 9.00 | 9.00 | 9.00 | 9.00 | 9.00 | 9.00 | 9.00 |
| PEG200 | | | | | | | | | | | | | |
| PEG400 | | | | | | | | | | | | | |
| PEG600 | | | | | | | | | | | | | |
| PEG1000 | 10.00 | 10.00 | 10.00 | 10.00 | 10.00 | 10.00 | 10.00 | 10.00 | 10.00 | 10.00 | 10.00 | 10.00 | |
| PEG4000 | | | | | | | | | | | | | 10.00 |
| PEG6000 | | | | | | | | | | | | | |
| Diethylene glycol | | | | | | | | | | | | | |
| Triethylene glycol | 8.00 | 5.20 | 8.00 | 8.00 | 8.00 | 8.00 | 8.00 | 8.00 | 8.00 | 8.00 | 8.00 | 8.00 | 8.00 |
| 2-Pyrrolidone | | | | | | | | | | | | | |
| 1,2-Hexane diol | | | | | | | | | | | | | |
| Acetylenol E60 | 0.50 | 0.50 | 0.35 | 0.30 | | | | 0.50 | 0.50 | 0.50 | 0.50 | 0.50 | 0.50 |
| Acetylenol E100 | | | | | 2.00 | | | | | | | | |
| NIKKOL BL-9EX | | | | | | 0.50 | | | | | | | |
| Zonyl FS3100 | | | | | | | 0.20 | | | | | | |
| Adeka Pluronic L31 | | | | | | | | | | | | | |
| Ion exchange water | 26.20 | | 22.65 | 22.70 | 21.00 | 22.50 | 22.80 | 22.50 | 22.50 | 22.50 | 22.50 | 22.50 | 22.50 |
| Pigment content P (%) | 6.00 | 6.00 | 6.00 | 6.00 | 6.00 | 6.00 | 6.00 | 6.00 | 6.00 | 6.00 | 6.00 | 6.00 | 6.00 |
| Content E (%) of PEG (number average molecular weight of 600 or more) | 10.00 | 10.00 | 10.00 | 10.00 | 10.00 | 10.00 | 10.00 | 10.00 | 10.00 | 10.00 | 10.00 | 10.00 | 10.00 |
| Urethane resin content U (%) | 0.26 | 6.06 | 1.00 | 1.00 | 1.00 | 1.00 | 1.00 | 1.00 | 1.00 | 1.00 | 1.00 | 1.00 | 1.00 |
| Acrylic resin content A (%) | 1.00 | 1.00 | 1.00 | 1.00 | 1.00 | 1.00 | 1.00 | 1.00 | 1.00 | 1.00 | 1.00 | 1.00 | 1.00 |
| E/P (times) | 1.67 | 1.67 | 1.67 | 1.67 | 1.67 | 1.67 | 1.67 | 1.67 | 1.67 | 1.67 | 1.67 | 1.67 | 1.67 |
| U/P (times) | 0.04 | 1.01 | 0.17 | 0.17 | 0.17 | 0.17 | 0.17 | 0.17 | 0.17 | 0.17 | 0.17 | 0.17 | 0.17 |
| A/U (times) | 3.85 | 0.17 | 1.00 | 1.00 | 1.00 | 1.00 | 1.00 | 1.00 | 1.00 | 1.00 | 1.00 | 1.00 | 1.00 |
| Viscosity of ink (mPa·s) | 6 | 11 | 7 | 7 | 7 | 7 | 7 | 6 | 8 | 6 | 8 | 7 | 9 |
| Surface tension of ink (mN/m) | 32 | 32 | 35 | 36 | 33 | 35 | 30 | 32 | 32 | 32 | 32 | 32 | 32 |

TABLE 6

Composition and characteristics of ink

| | No. of ink | | | | | | | | | | | |
|---|---|---|---|---|---|---|---|---|---|---|---|---|
| | 27 | 28 | 29 | 30 | 31 | 32 | 33 | 34 | 35 | 36 | 37 | 38 |
| Pigment dispersion 1 | 40.00 | 40.00 | 40.00 | 40.00 | 40.00 | 40.00 | 40.00 | 40.00 | 40.00 | 40.00 | 40.00 | |
| Pigment dispersion 2 | | | | | | | | | | | | |
| Pigment dispersion 3 | | | | | | | | | | | | |
| Pigment dispersion 4 | | | | | | | | | | | | |
| Pigment dispersion 5 | | | | | | | | | | | | |
| Pigment dispersion 6 | | | | | | | | | | | | |
| Pigment dispersion 7 | | | | | | | | | | | | 40.00 |
| Pigment dispersion 8 | | | | | | | | | | | | |
| Pigment dispersion 9 | | | | | | | | | | | | |
| Liquid containing the urethane resin 1 | 5.00 | | | | | | 5.00 | 5.00 | 5.00 | 11.00 | 5.00 | |
| Liquid containing the urethane resin 2 | | 5.00 | | | | | | | | | | |
| Liquid containing the urethane resin 3 | | | 5.00 | | | | | | | | | 1.30 |
| Liquid containing the urethane resin 4 | | 5.00 | | 5.00 | | | | | | | | |
| Liquid containing the urethane resin 5 | | | | | 5.00 | | | | | | | |
| Liquid containing the urethane resin 6 | | | | | | 5.00 | | | | | | |
| Liquid containing the acrylic resin 1 | 5.00 | 5.00 | 5.00 | 5.00 | 5.00 | 5.00 | | | | 5.00 | 17.00 | |
| Liquid containing the acrylic resin 2 | | | | | | | 5.00 | | | | | 0.20 |
| Liquid containing the acrylic resin 3 | | | | | | | | 5.00 | | | | |
| Liquid containing the acrylic resin 4 | | | | | | | | | 5.00 | | | |
| Liquid containing the acrylic resin 5 | | | | | | | | | | | | |
| Glycerin | 9.00 | 9.00 | 9.00 | 9.00 | 9.00 | 9.00 | 9.00 | 9.00 | 9.00 | 9.00 | 9.00 | 9.00 |
| PEG200 | | | | | | | | | | | | |
| PEG400 | | | | | | | | | | | | |
| PEG600 | | | | | | | | | | | | |
| PEG1000 | | 10.00 | 10.00 | 10.00 | 10.00 | 10.00 | 10.00 | 10.00 | 10.00 | 10.00 | 10.00 | |
| PEG4000 | | | | | | | | | | | | |
| PEG6000 | 10.00 | | | | | | | | | | | 6.20 |
| Diethylene glycol | | | | | | | | | | | | |

TABLE 6-continued

Composition and characteristics of ink

| | No. of ink | | | | | | | | | | | |
|---|---|---|---|---|---|---|---|---|---|---|---|---|
| | 27 | 28 | 29 | 30 | 31 | 32 | 33 | 34 | 35 | 36 | 37 | 38 |
| Triethylene glycol | 8.00 | 8.00 | 8.00 | 8.00 | 8.00 | 8.00 | 8.00 | 8.00 | 8.00 | 8.00 | 8.00 | 11.80 |
| 2-Pyrrolidone | | | | | | | | | | | | |
| 1,2-Hexane diol | | | | | | | | | | | | |
| Acetylenol E60 | 0.50 | 0.50 | 0.50 | 0.50 | 0.50 | 0.50 | 0.50 | 0.50 | 0.50 | 0.50 | 0.50 | |
| Acetylenol E100 | | | | | | | | | | | | 0.90 |
| NIKKOL BL-9EX | | | | | | | | | | | | |
| Zonyl FS3100 | | | | | | | | | | | | |
| Adeka Pluronic L31 | | | | | | | | | | | | |
| Ion exchange water | 22.50 | 22.50 | 22.50 | 22.50 | 22.50 | 22.50 | 22.50 | 22.50 | 22.50 | 16.50 | 10.50 | 30.60 |
| Pigment content P (%) | 6.00 | 6.00 | 6.00 | 6.00 | 6.00 | 6.00 | 6.00 | 6.00 | 6.00 | 6.00 | 6.00 | 6.00 |
| Content E (%) of PEG (number average molecular weight of 600 or more) | 10.00 | 10.00 | 10.00 | 10.00 | 10.00 | 10.00 | 10.00 | 10.00 | 10.00 | 10.00 | 10.00 | 6.20 |
| Urethane resin content U (%) | 1.00 | 1.00 | 1.00 | 1.00 | 1.00 | 1.00 | 1.00 | 1.00 | 1.00 | 2.20 | 1.00 | 0.26 |
| Acrylic resin content A (%) | 1.00 | 1.00 | 1.00 | 1.00 | 1.00 | 1.00 | 1.00 | 1.00 | 1.00 | 1.00 | 3.40 | 0.04 |
| E/P (times) | 1.67 | 1.67 | 1.67 | 1.67 | 1.67 | 1.67 | 1.67 | 1.67 | 1.67 | 1.67 | 1.67 | 1.03 |
| U/P (times) | 0.17 | 0.17 | 0.17 | 0.17 | 0.17 | 0.17 | 0.17 | 0.17 | 0.17 | 0.37 | 0.17 | 0.04 |
| A/U (times) | 1.00 | 1.00 | 1.00 | 1.00 | 1.00 | 1.00 | 1.00 | 1.00 | 1.00 | 0.45 | 3.40 | 0.15 |
| Viscosity of ink (mPa · s) | 11 | 7 | 7 | 7 | 7 | 7 | 7 | 7 | 7 | 9 | 8 | 7 |
| Surface tension of ink (mN/m) | 32 | 32 | 32 | 32 | 32 | 32 | 32 | 32 | 32 | 32 | 32 | 36 |

TABLE 7

Composition and characteristics of ink

| | No. of ink | | | | | | | | |
|---|---|---|---|---|---|---|---|---|---|
| | 39 | 40 | 41 | 42 | 43 | 44 | 45 | 46 | 47 |
| Pigment dispersion 1 | | 40.00 | 40.00 | 40.00 | 40.00 | | | 40.00 | |
| Pigment dispersion 2 | | | | | | | | | |
| Pigment dispersion 3 | | | | | | | | | |
| Pigment dispersion 4 | | | | | | | | | |
| Pigment dispersion 5 | | | | | | | | | |
| Pigment dispersion 6 | | | | | | 20.00 | 20.00 | | |
| Pigment dispersion 7 | | | | | | | | | |
| Pigment dispersion 8 | 40.00 | | | | | | | | |
| Pigment dispersion 9 | | | | | | | | 26.70 | |
| Liquid containing the urethane resin 1 | 5.00 | 5.00 | 5.00 | | 5.00 | 7.50 | 6.00 | | 5.00 |
| Liquid containing the urethane resin 2 | | | | | | | | | |
| Liquid containing the urethane resin 3 | | | | | | | | | |
| Liquid containing the urethane resin 4 | | | | | | | | | |
| Liquid containing the urethane resin 5 | | | | | | | | | |
| Liquid containing the urethane resin 6 | | | | | | | | | |
| Liquid containing the acrylic resin 1 | 5.00 | 5.00 | 5.00 | 5.00 | 5.00 | | 3.00 | | 5.00 |
| Liquid containing the acrylic resin 2 | | | | | | | | | |
| Liquid containing the acrylic resin 3 | | | | | | | | | |
| Liquid containing the acrylic resin 4 | | | | | | | | | |
| Liquid containing the acrylic resin 5 | | | | | | | | 6.60 | |
| Glycerin | 9.00 | 9.00 | 9.00 | 9.00 | 9.00 | 9.00 | 9.00 | 10.00 | 9.00 |
| PEG200 | | | | | | | | | 5.00 |
| PEG400 | | | 10.00 | | | | | | 5.00 |
| PEG600 | 10.00 | | | 10.00 | | | | 3.00 | |
| PEG1000 | | 7.00 | | | | 3.00 | 0.20 | | |
| PEG4000 | | | | | | | | | |
| PEG6000 | | | | | | | | | |
| Diethylene glycol | | | | | | 5.00 | 5.00 | | |
| Triethylene glycol | 8.00 | | 8.00 | 8.00 | 8.00 | 5.00 | 5.00 | | 8.00 |
| 2-Pyrrolidone | | | | | | | | 5.00 | |
| 1,2-Hexane diol | | | | | | | | 2.00 | |
| Acetylenol E60 | 0.50 | 0.50 | 0.50 | 0.50 | 0.50 | | | 0.50 | |
| Acetylenol E100 | | | | | | 0.10 | 0.20 | | |
| NIKKOL BL-9EX | | | | | | | | | |
| Zonyl FS3100 | | | | | | | | 0.10 | |
| Adeka Pluronic L31 | | | | | | | | | |
| Ion exchange water | 22.50 | 33.50 | 22.50 | 27.50 | 32.50 | 50.40 | 51.60 | 46.60 | 22.50 |
| Pigment content P (%) | 6.00 | 6.00 | 6.00 | 6.00 | 6.00 | 3.00 | 3.00 | 4.01 | 6.0 |
| Content E (%) of PEG (number average molecular weight of 600 or more) | 10.00 | 7.00 | 0.00 | 10.00 | 0.00 | 3.00 | 0.20 | 3.00 | 0.0 |

TABLE 7-continued

Composition and characteristics of ink

| | No. of ink | | | | | | | | |
|---|---|---|---|---|---|---|---|---|---|
| | 39 | 40 | 41 | 42 | 43 | 44 | 45 | 46 | 47 |
| Urethane resin content U (%) | 1.00 | 1.00 | 1.00 | 0.00 | 1.00 | 1.50 | 1.20 | 0.00 | 1.00 |
| Acrylic resin content A (%) | 1.00 | 1.00 | 1.00 | 1.00 | 1.00 | 0.00 | 6.00 | 0.99 | 1.00 |
| E/P (times) | 1.67 | 1.17 | 0.00 | 1.67 | 0.00 | 1.00 | 0.07 | 0.75 | 0.00 |
| U/P (times) | 0.17 | 0.17 | 0.17 | 0.00 | 0.17 | 0.50 | 0.40 | 0.00 | 0.17 |
| A/U (times) | 1.00 | 1.00 | 1.00 | — | 1.00 | 0.00 | 5.00 | — | 1.00 |
| Viscosity of ink (mPa · s) | 8 | 4 | 5 | 5 | 5 | 4 | 4 | 4 | 5 |
| Surface tension of ink (mN/m) | 32 | 32 | 32 | 32 | 32 | 32 | 32 | 38 | 32 |

<Evaluation>

According to the present invention, AA, A, or B is determined as an acceptable level and C is determined as a non-acceptable level in the evaluation criteria for the evaluation described below.

Ink was charged in each ink cartridge and then set in ink jet recording devices 1 to 3 which are mounted with a recording head for ejecting ink by heat energy. Constitution of the ink jet recording devices 1 to 3 is described in Table 8. When the number of pass is one time, the aqueous ink is applied to a unit area of a recording medium according to one relative scanning with the recording head and recording medium. When the number of pass is 2 times, the aqueous ink is applied to a unit area of a recording medium according to repeating 2 times the scanning of recording head. In the Table 8, the "unit area" means a unit area (1 pixel) of 1/600 inch×1/600 inch. According to the devices 1 and 2, an image recorded at conditions for applying one drop of ink with an amount of 14 ng on a unit area of 1/600 inch×1/600 inch is defined to have recording duty of 100%. According to the device 3, an image recorded at conditions for applying 2 drops of ink with an amount of 14 ng on a unit area of 1/600 inch×1/600 inch is defined to have recording duty of 100%. The evaluation results are described in Table 9.

TABLE 8

Constitution of ink jet recording device

| | Device 1 | Device 2 | Device 3 |
|---|---|---|---|
| Ink jet recording device | FIG. 3 (line type) | FIG. 2 (serial type) | FIG. 2 (serial type) |
| Number of pass | 1 Time | 1 Time | 2 Times |
| Ink application amount per unit area | About 14 ng | About 14 ng | About 28 ng |

(Optical Density)

By using the above ink jet recording devices 1 to 3, a solid image of 3 cm×2 cm was recorded on 3 kinds of recording medium ((1) PPC paper•PB PAPER, manufactured by Canon, (2) PPC paper•Bright white, manufactured by Hewlett Packard, and (3) PPC paper•Canon EXTRA, manufactured by Canon). By using the devices 1, 2, and 3, a solid image with recording duty of 100% was recorded. The obtained solid image was left to stand for 24 hours in an environment with temperature of 25° C. and relative humidity of 50% followed by drying. Then, the optical density of the obtained image was measured by using an optical densitometer (Macbeth RD-918, manufactured by Macbeth).

AA: The average optical density of an image of three kinds of recording medium was 1.55 or more.

A: The average optical density of an image of three kinds of recording medium was 1.50 or more but less than 1.55.

B: The average optical density of an image of three kinds of recording medium was 1.45 or more but less than 1.50.

C: The average optical density of an image of three kinds of recording medium was less than 1.45.

(Sticking Recovery Property)

Two ink cartridges were prepared for each ink. The ink jet recording device 1 was mounted with the two ink cartridges, and after performing the recovery movement, one drop of the ink was ejected from every ejection opening so as to record a vertical line with width of 1 dot. After that, the recording head mounted with ink cartridge (i.e., head cartridge) was removed from the ink jet recording device 1, and left to stand for 30 days in an environment with temperature of 25° C. and relative humidity of 50%. Then, the head cartridge was mounted again on the ink jet recording device 1, and a nozzle check pattern was recorded. If the nozzle check pattern is not recorded in regular manner and clogging occurs, the recovery movement from a printer driver was carried out. Then, one drop of the ink was again ejected from every ejection opening so as to record the same vertical line. If there is still an occurrence of clogging at that moment, after carrying out the recovery movement from a printer driver, one drop of the ink was again ejected from every ejection opening so as to record the same vertical line. If there is still an occurrence of clogging after that, after carrying out the recovery movement from a printer driver, one drop of the ink was again ejected from every ejection opening so as to record the same vertical line. Accordingly, based on the number of the recovery movement that is required for having regular recording of a vertical line, the sticking recovery property was evaluated.

AA: According to any of the two ink cartridges, by carrying out the recovery movement once, the ink was ejected in regular manner from every ejection opening.

A: According to one ink cartridge, the ink was ejected in regular manner from every ejection opening by carrying out the recovery movement once. According to the other ink cartridge, the ink was not ejected from part of ejection openings even after carrying out the recovery movement once. However, by carrying out the recovery movement once more, the ink was ejected in regular manner from every ejection opening.

B: According to any of the two ink cartridges, the ink was not ejected from part of ejection openings even after carrying out the recovery movement once. However, by carrying out the recovery movement once more, the ink was ejected in regular manner from every ejection opening.

C: According to any of the two ink cartridges, the ink was not ejected from part of ejection openings even after carrying out the recovery movement twice. However, by carrying out the recovery movement once more, the ink was ejected in regular manner from every ejection opening.

TABLE 9

Evaluation result

| | No. of ink | No. of device used for optical density measurement | Optical density | Sticking recovery property |
|---|---|---|---|---|
| Example | | | | |
| 1 | 1 | 1 | AA | AA |
| 2 | 2 | 1 | AA | AA |
| 3 | 3 | 1 | AA | AA |
| 4 | 4 | 1 | AA | AA |
| 5 | 5 | 1 | AA | AA |
| 6 | 6 | 1 | AA | AA |
| 7 | 7 | 1 | A | A |
| 8 | 8 | 1 | A | AA |
| 9 | 9 | 1 | AA | B |
| 10 | 10 | 1 | AA | AA |
| 11 | 11 | 1 | AA | A |
| 12 | 12 | 1 | AA | AA |
| 13 | 13 | 1 | AA | AA |
| 14 | 14 | 1 | A | A |
| 15 | 15 | 1 | A | AA |
| 16 | 16 | 1 | AA | AA |
| 17 | 17 | 1 | A | AA |
| 18 | 18 | 1 | A | AA |
| 19 | 19 | 1 | A | AA |
| 20 | 20 | 1 | A | AA |
| 21 | 21 | 1 | AA | AA |
| 22 | 22 | 1 | AA | AA |
| 23 | 23 | 1 | A | A |
| 24 | 24 | 1 | A | A |
| 25 | 25 | 1 | A | A |
| 26 | 26 | 1 | AA | AA |
| 27 | 27 | 1 | A | AA |
| 28 | 28 | 1 | AA | AA |
| 29 | 29 | 1 | AA | AA |
| 30 | 30 | 1 | A | A |
| 31 | 31 | 1 | A | A |
| 32 | 32 | 1 | A | A |
| 33 | 33 | 1 | AA | AA |
| 34 | 34 | 1 | AA | AA |
| 35 | 35 | 1 | AA | AA |
| 36 | 36 | 1 | AA | AA |
| 37 | 37 | 1 | AA | AA |
| 38 | 38 | 1 | B | B |
| 39 | 1 | 2 | AA | AA |
| Comparative Example | | | | |
| 1 | 39 | 1 | C | C |
| 2 | 40 | 1 | C | AA |
| 3 | 41 | 1 | C | C |
| 4 | 42 | 1 | C | C |
| 5 | 43 | 1 | C | C |
| 6 | 44 | 1 | C | B |
| 7 | 45 | 1 | C | B |
| 8 | 46 | 1 | C | C |
| 9 | 47 | 1 | C | C |
| Reference Example | | | | |
| 1 | 1 | 3 | AA | AA |
| 2 | 40 | 3 | AA | AA |
| 3 | 43 | 3 | AA | C |
| 4 | 42 | 3 | AA | C |

According to the evaluation results of Example 38, both the optical density and sticking recovery property were B, but they were inferior to other Bs. When comparison is made between Example 39 and Reference Examples 1 to 4, from Example 39 with small ink application amount due to pass number of 1, the optical density was obtained at the same level as Reference Examples 1 to 4 in which the ink application amount is high by having pass number 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-224304, filed Nov. 17, 2016, and 2017-203705, filed Oct. 20, 2017, which are hereby incorporated by reference herein in their entirety.

What is claimed is:

1. An ink jet recording method comprising:
   performing application of an aqueous ink onto a unit area by one relative scanning with a recording head and a recording medium to record an image,
   wherein the aqueous ink comprises a self-dispersion pigment, a urethane resin, polyethylene glycol, and an acrylic resin,
   wherein a kind of the self-dispersion pigment is carbon black,
   wherein a number average molecular weight of the polyethylene glycol is 600 or more, and
   wherein a viscosity of the aqueous ink is 5 mPa·s or more.

2. The ink jet recording method according to claim 1, wherein a content (% by mass) of the polyethylene glycol in the aqueous ink is, in terms of mass ratio relative to a content (% by mass) of the self-dispersion pigment, 1.10 times or more to 3.30 times or less.

3. The ink jet recording method according to claim 1, wherein a content (% by mass) of the acrylic resin in the aqueous ink is, in terms of mass ratio relative to a content (% by mass) of the urethane resin, 0.20 times or more.

4. The ink jet recording method according to claim 3, wherein the content (% by mass) of the acrylic resin in the aqueous ink is, in terms of mass ratio relative to the content (% by mass) of the urethane resin, 3.85 times or less.

5. The ink jet recording method according to claim 1, wherein a content (% by mass) of the urethane resin in the aqueous ink is, in terms of mass ratio relative to a content (% by mass) of the self-dispersion pigment, 0.05 times or more to 1.00 times or less.

6. The ink jet recording method according to claim 1, wherein a surface tension of the aqueous ink is 35 mN/m or less.

7. The ink jet recording method according to claim 6, wherein the surface tension of the aqueous ink is 30 mN/m or higher.

8. The ink jet recording method according to claim 1, wherein the recording head is a line head.

9. The ink jet recording method according to claim 1, wherein an anionic group that binds to a particle surface of the self-dispersion pigment is a carboxylic acid group represented by —COOM, where M is a hydrogen atom, an alkali metal, ammonium ($NH_4$), or organic ammonium.

10. The ink jet recording method according to claim 1, wherein the acid number of the acrylic resin is 100 mgKOH/g or more.

11. The ink jet recording method according to claim 1, wherein the acid number of the acrylic resin is 200 mgKOH/g or less.

12. The ink jet recording method according to claim 1, wherein the viscosity of the aqueous ink is 11 mPa·s or less.

13. The ink jet recording method according to claim 1, wherein the content (% by mass) of the acrylic resin in the ink is 0.50% by mass or more to 2.00% by mass or less based on the total mass of the ink.

14. The ink jet recording method according to claim 1, wherein the content (% by mass) of the urethane resin in the ink is 0.30% by mass or more to 5.00% by mass or less based on the total mass of the ink.

15. The ink jet recording method according to claim 1, wherein the content (% by mass) of the polyethylene glycol in the ink is 6.00% by mass or more to 20.00% by mass or less based on the total mass of the ink.

16. The ink jet recording method according to claim 1, wherein the number average molecular weight of the polyethylene glycol is 1,000.

17. An ink jet recording device comprising:
a unit for performing application of an aqueous ink onto a unit area by one relative scanning with a recording head and a recording medium,
wherein the aqueous ink comprises a self-dispersion pigment, a urethane resin, polyethylene glycol, and an acrylic resin,
wherein a kind of the self-dispersion pigment is carbon black,
wherein a number average molecular weight of the polyethylene glycol is 600 or more, and
wherein a viscosity of the aqueous ink is 5 mPa·s or more.

* * * * *